United States Patent

Wintermantel et al.

[11] Patent Number: 5,229,055
[45] Date of Patent: Jul. 20, 1993

[54] METHOD AND APPARATUS OF PRODUCING HOLLOW PROFILES FROM MULTILAYER STARTING MATERIAL

[75] Inventors: Erich Wintermantel, Jahnallee 41, 5300 Bonn 2; Oswald Landwehr, Meckenheim, both of Fed. Rep. of Germany

[73] Assignee: Erich Wintermantel, Fed. Rep. of Germany

[21] Appl. No.: 857,456

[22] Filed: Mar. 25, 1992

[30] Foreign Application Priority Data

Mar. 26, 1991 [DE] Fed. Rep. of Germany ....... 4109885
Jul. 24, 1991 [EP] European Pat. Off. ........ 91306748.4

[51] Int. Cl.⁵ .................. B29C 55/08; D06F 29/00
[52] U.S. Cl. .......................... 264/167; 26/85;
72/58; 72/180; 72/208; 72/226; 264/280;
264/324; 264/103; 264/DIG. 73; 425/3;
425/335; 425/403
[58] Field of Search ............... 26/84, 85, 73; 264/167,
264/324, 280, 173, 166, 165, 560, 103, DIG. 73;
425/326.1, 385, 393, 402, 403, 403.1, 373, 3,
460, 335; 72/58, 180, 208, 226

[56] References Cited

U.S. PATENT DOCUMENTS

| 2,294,642 | 9/1942 | Wedler | 26/85 |
| 3,175,272 | 3/1965 | Cohn et al. | 26/84 |
| 3,201,827 | 8/1965 | Reynolds . | |
| 3,378,428 | 4/1968 | Boggs . | |
| 3,860,368 | 1/1975 | Kerttula et al. | 425/3 |
| 4,628,712 | 12/1986 | Strudel | 26/85 |
| 4,799,822 | 1/1989 | Wintermantel et al. . | |

FOREIGN PATENT DOCUMENTS

| 690283 | 4/1953 | United Kingdom | 26/85 |
| 2035404 | 6/1980 | United Kingdom | 26/85 |

Primary Examiner—Jeffery Thurlow
Assistant Examiner—Mathieu Vargot
Attorney, Agent, or Firm—Wall and Roehrig

[57] ABSTRACT

Hollow profile elements are formed by shaping a starting workpiece that consists of multiple layers of a material having a large width-to-thickness ratio, e.g., woven fabrics or laid materials. The layers are joined by seams to define elongated pockets or channels. Shaping tools are inserted into these channels to form the profile elements with a desired cross sectional shape, which can be constant or varied. The shaping tools employ one or more endless belts that extend in closed loops around guide rollers; the belts are driven so that during the shaping process sliding friction is substantially eliminated between the material of the workpiece and the respective shaping tool.

10 Claims, 5 Drawing Sheets

METHOD AND APPARATUS OF PRODUCING HOLLOW PROFILES FROM MULTILAYER STARTING MATERIAL

BACKGROUND OF THE INVENTION

This invention relates to a method of producing hollow profiles from multilayer starting materials, such as woven fabrics, knitted fabrics, laid materials, webs or the like, having a large width-to-thickness ratio, in a continuous process. The invention also relates to hollow profiles which are produced in accordance with the method of the invention, the form of which is determined by features of the production process.

Methods of producing hollow profiles from multilayer woven fabrics, laid materials, knitted fabrics or webs are known wherein these starting materials are shaped by being drawn onto mandrel-shaped tools or other shaping tools along with the occurrence of sliding friction. The cross-sectional geometry of the shaping tool or tools then determines the clear cross-section of the hollow profile which is produced or rather of the channels in the hollow profile which is produced.

Also known are processes for manufacturing hollow profiles in which the shaping is effected by pressure impingement on the channels or pockets which are already formed in the starting materials. The expansion and the final geometric shape of the hollow profiles can, in such cases, possibly also be influenced by external limitations. In the case of starting materials having an open surface, i.e. one permeable to gas and liquid, it is known to employ the latter method by introducing thin-walled foil tubes or sleeves into the channels or pockets of the starting materials, upon production or subsequently, to enable their expansion by pressure impingement thereon. After the shaping process is completed, these inserts can remain as "lost cores" in the hollow profiles or they can be removed.

In the various known methods, just mentioned, it is also known to wet or to impregnate the starting materials prior to or during the shaping process with a matrix, such as a synthetic resin or plastics material, and to cause this matrix, after shaping of the hollow profile structure has been effected, to harden, e.g. by the supply of heat, and thus to stiffen this structure.

The known methods can be used to produce hollow profiles which have only one coherent cavity (hollow space) or profiles which have several separate cavities.

OBJECTS AND SUMMARY OF THE INVENTION

The method in accordance with the invention for production of hollow profiles from multilayer starting materials having a large width-to-thickness ratio is characterised in that the regions of one or more shaping tools which come into contact with the material that is to be or is being shaped are designed as endless, revolving component parts so that during the progressive shaping process substantially no sliding friction takes place between the starting material or the material being processed and the shaping tool or tools.

. The starting materials may be natural materials of vegetable, animal or mineral origin, e.g. cotton, or wool, or glass or metal, respectively, or they may be synthetic materials, such as plastics. They will be prefabricated into appropriate multilayer form, with lines or regions of joins between the layers.

The endless revolving component parts may take the form of loops, more specifically rings, bands or belts, or of tubes or hoses or the like. Moreover, these revolving elements can be formed of homogeneous material or may be braided, knitted, woven or organised in a chain-like manner and they may have either a constant or varying cross-section over their length.

By avoiding sliding friction between the shaping tool or tools and the starting material the following advantages are achieved:

With starting materials made from woven fabrics, knitted fabrics or laid materials, in particular those having a comparatively coarse-meshed structure and/or "loose" thread binding (open texture), no warping arises.

With starting materials which, for the purpose of sealing and/or stabilisation, have undergone vapour deposition or are provided with a coating or are wetted or impregnated with a liquid or pasty matrix, this coating or matrix is not uncontrolledly displaced, reduced or removed.

On initial products which, for the purpose of their sealing and/or stabilisation, have undergone vapour deposition or are provided with a coating or are wetted or impregnated with a liquid or pasty matrix, this vapour deposit, coating or matrix can be hardened accurately, after shaping has been effected, while still on the shaping tool, e.g. by the supply of heat, without any structural damage arising to the vapour deposit, coating or matrix because of it being subjected to a squeezing process in the hardening phase.

With starting materials which are conducted in an accurately fitting manner, and possibly along with certain initial tension, over the shaping tool or tools, only comparatively slight advancing or feeding forces needed to be expended.

The starting materials, when they move over the shaping tools, can be limited from the outside, e.g. by bands or belts, and possibly by pressure, to achieve a high accuracy of size, without the risk of increased damage to the starting material, e.g. by warping.

The shaping tools do not wear away and lose their accuracy of shape as a result of abrasion.

The shaping tools do not get contaminated as a result of deposits and thereby lose their accuracy of shape.

In the method in accordance with the invention, the advancing movement of the starting material over the shaping tool or tools or with which the shaping tool or tools progress in or on the starting material, can, on the one hand, be brought about by means separate from the shaping tool or tools, but, on the other hand, may be brought about directly by way of the shaping tool or tools themselves.

It is possible in some methods in accordance with the invention to vary the cross-sectional geometry of the shaping tool or tools gradually or steplessly during the shaping process in such a way that:

possible tolerances in size of the starting material are compensated for, and/or the tension which is introduced into the starting material from the shaping tool or tools increases or decreases, and/or from a starting material having constant or varying cross-sectional dimensions over its length, hollow profiles having cross-sectional geometries which are different over their length, e.g. becoming steadily or alternately larger or smaller, can be produced during the continuous shaping process.

The cross-section of the shaping tool can, in this respect, in the initial position or after change of shape has been effected, define a round or otherwise curved contour or a symmetrical or unsymmetrical polygon contour. In the case of shaping processes which involve the simultaneous use of several shaping tools, these tools can have the same cross-section or different cross-sections. Several shaping tools can also be arranged in such a way with regard to one another and be so designed that the starting material is not reshaped into a planar hollow profile structure, but into one which is curved or arched in its transverse direction or in its longitudinal direction or, indeed, in both those directions.

Suitable starting materials can, in accordance with the method of the invention, be restructured in such a way that they have channel-shaped cavities lying in an orderly aligned manner side-by-side or one above the other, or both side-by-side and one above the other, or aligned in a disordered manner with regard to one another. Adjacent cavities/channels can be connected to one another continuously or only in certain sections, and either linearly or areally.

In the method of the invention, the shaping tools bring about shaping of the starting material by way of revolving endless loops or the like which necessarily stand directly in contact with the starting material. However, the starting material and the shaping tool or tools have to move relative to one another to accomplish a progressive shaping process, so it is necessary to exert forces on the shaping tool or tools to fix their position, and on the starting material to bring about their advance over the tool(s). In various methods in accordance with the invention, retaining forces can be brought to bear on the shaping tools by mechanical support or suspension or contactlessly, e.g. by a magnetic or electrical field. If, for the shaping process, several shaping tools are arranged side-by-side and/or one above the other, then the retaining forces acting directly on the shaping tools arranged at the outside of the group of tools can be further transmitted contactlessly to the farther inwardly lying shaping tools As a result of the procedures proceeding in a controlled manner and free from sliding friction between the shaping tool or tools and the starting material, the shaping process can be carried out continuously and economically, with high reproducible quality of the hollow profiles produced A large number of different hollow profiles can be produced by methods in accordance with the invention. Such hollow profiles may consist of several interconnected, e.g. integrally interwoven channel-shaped cavities and these cavities/channels have a round or otherwise curved circumferential contour, or have symmetrical or a symmetrical polygonal cross-sections, have the same or different cross-sections, be arranged in one plane side-by-side or one above the other or in multilayer manner both side-by-side and one above the other, form a three-dimensional shape which has curvatures or archings over the transverse cross-section or along the longitudinal axis or both over the transverse cross-section and along the longitudinal axis.

The connection of adjacent cavities/channels can be effected linearly or areally (i e. over an area of their adjoining surface) and either continuously or with interruptions along their respective longitudinal axis.

Characteristic features of various exemplary methods and hollow profiles in accordance with the invention will be explained with reference to the diagrammatic representations in FIGS. 1 to 6. Each Figure, with the exception of FIG. 5, consists of several representations so that, for example, the representations FIGS. 1a to 1e belong to FIG. 1.

DESCRIPTION OF THE PREFERRED EMBODIMENTS

Figure 1A:
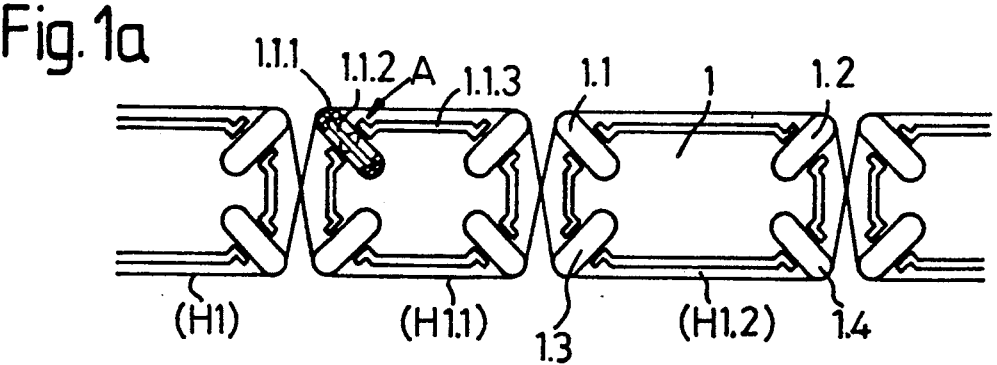
FIGS. 1a, 2a, 3a and 4a depict, in cross-section, respective shaping tools or parts thereof, surrounded by hollow profiles produced thereby.

Starting with the first embodiment depicted in the drawings of FIG. 1, FIG. 1a shows several shaping tools 1, arranged side-by-side, each comprising four approximately diagonally disposed shaping units 1.1, 1.2, 1.3 and 1.4. Each of these shaping units consists of an endless loop 1.1.1 and rotatably mounted deflection and guide rollers 1.1.2 and the respective shaping units are connected together by way of a retaining frame 1.1.3 on which the rollers are mounted. The geometric shape and the positioning of the shaping tools determine the shape of the hollow profile H 1 produced thereby.

Figure 1B:
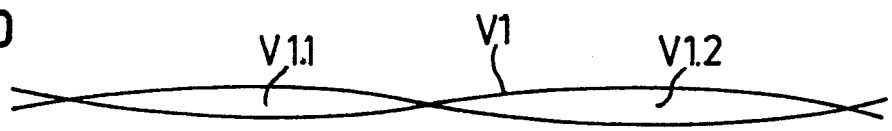
FIGS. 1b, 2b, 3b and 4b depict, in cross-section, the substantially flat-lying unexpanded starting materials which are formed into hollow profiles by use of the shaping tools shown in the corresponding group of representations.

FIG. 1b shows the incompletely expanded starting material V 1, which has pockets or apertures V 1.1 and V 1.2, the circumference of which corresponds in length to the circumference of the channels H 1.1 and H 1.2 of the hollow profile H 1 to be formed therefrom. The adjacent pockets V 1.1 and V 1.2 are connected together, for example by adhesion, welding or stitching or by means of an integral interlinking or interweaving.

Figure 1C:
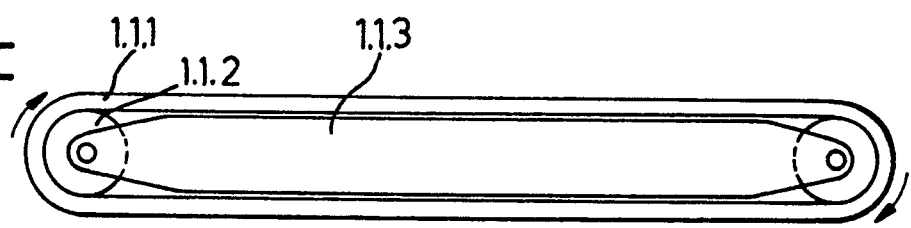
FIG. 1c shows in longitudinal direction the guidance of a single endlessly revolving shaping loop in accordance with the FIG. 1 embodiment.

FIG. 1c is a partial view of a shaping unit 1.1 in the direction of arrow A in FIG. 1, which clearly shows the unit to consist of a shaping loop 1.1.1, rotatably mounted deflection and guide rollers 1.1.2 and a retaining frame 1.1.3.

Figure 1D:
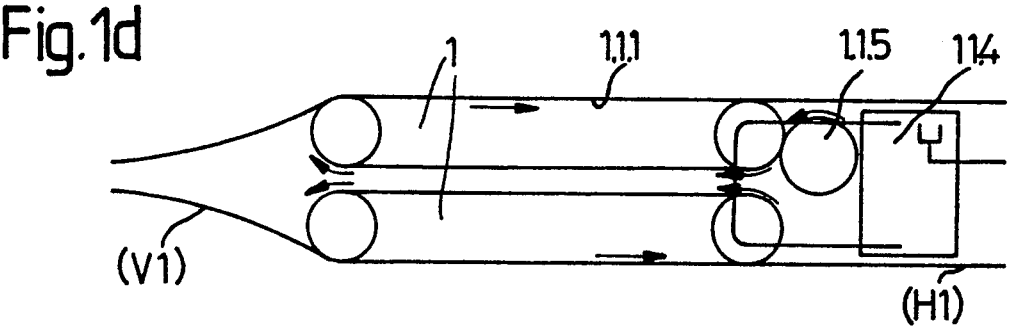
FIGS. 1d, 2c, 3c, 4c and 6a show longitudinal sections of the respective shaping tools with the hollow profiles formed thereover from the respective unexpanded or unstretched starting materials.

FIG. 1d shows one of the shaping tools 1 in a channel of the starting material V 1, or of the hollow profiles H 1. The shaping loop 1.1.1 is shown being driven by means of a friction wheel 1.1.5 by way of gearing 1.1.4 to bring about either the advance of the shaping tool 1 in the starting material V 1 or movement of the hollow profile H 1 over the shaping tool 1.

Figure 1E:
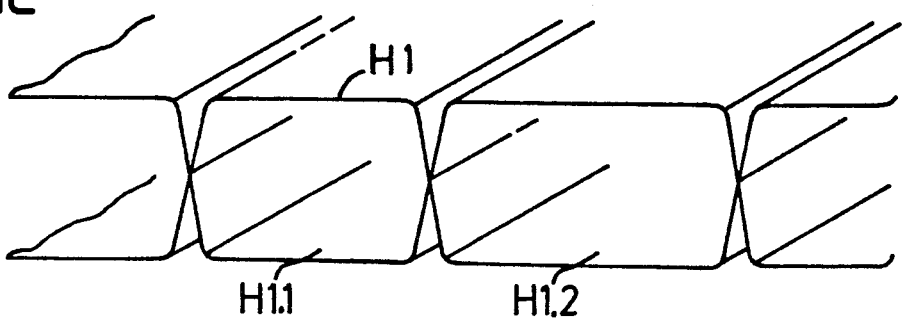
FIGS. 1e, 2d, 3d and 4d are diagrammatic perspective representations showing the respective cross-sectional geometry of the hollow profiles which are produced using the shaping tools shown in the corresponding group of representations.

FIG. 1e shows the hollow profile H 1 after shaping has been effected. It has channels H 1.1 and H 1.2 of different size which are connected together linearly in the longitudinal direction thereof.

Figure 2A:
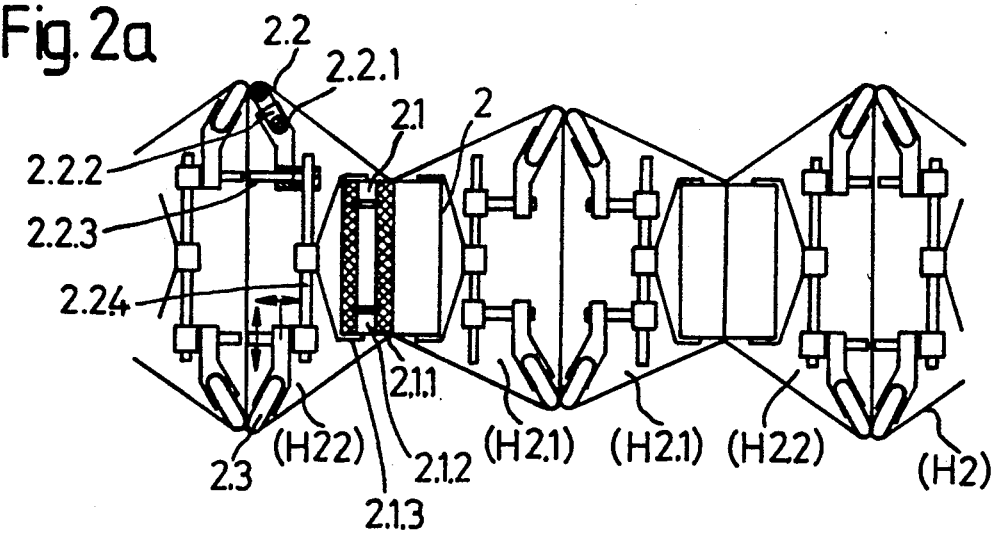

Turning now to the second embodiment depicted in the drawings of FIG. 2,

FIG. 2a shows shaping tools 2, arranged side-by-side as mirror-inverted pairs, and each comprising three shaping units 2.1, 2.2 and 2.3. The shaping unit 2.1 consists of a shaping loop 2.1.1 in the form of a flat belt and deflection and guide rollers 2.1.2 mounted on a retaining frame 2.1.3. The shaping units 2.2 and 2.3 each comprise a shaping loop 2.2.1 and deflection rollers 2.2.2, and they are each adjustable both in height and laterally on sliding guides 2.2.3 and 2.2.4 to allow modification of the cross-sectional geometry of the channels H 2.1 and H 2.2 of the hollow profile H 2 which they form. Changing of the channel cross-sections can, depending on the technical design of the shaping tool, be effected either in steps or steplessly during the shaping process. If the starting material consists of an inelastic material the length of the channel circumference will have to be maintained upon any cross-sectional change. In contrast, in the case of an elastic starting material, cross-sectional changes can be undertaken which lead to circumferential dimensions which differ from one another.

Figure 2B:
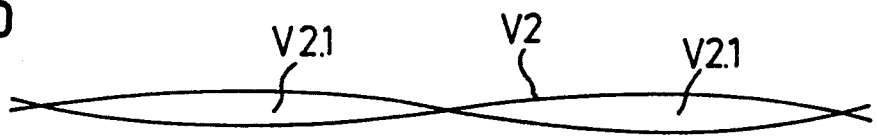

FIG. 2b shows the associated starting material V 2 in the incompletely expanded state. It has several pockets V 2.1 of identical size.

Figure 2C:
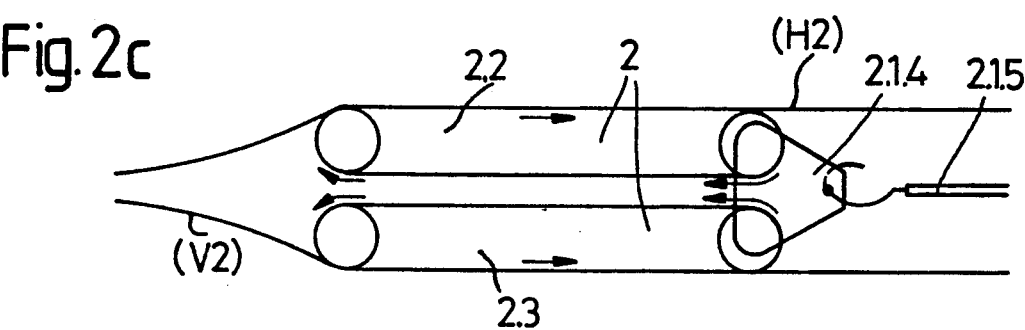

FIG. 2c shows how the forces developed between the shaping tool 2, with the shaping units 2.1, 2.2 and 2.3, and the starting material V 1, or the hollow profile H 2 formed therefrom, and tending to bring about relative movement therebetween, i.e. to advance the material over the shaping tool 2 and/or to advance the latter inside the material, are absorbed by way of a retaining coupling 2.1.4 and a retaining rod 2.1.5 which extends through the corresponding hollow profile channel.

Figure 2D:
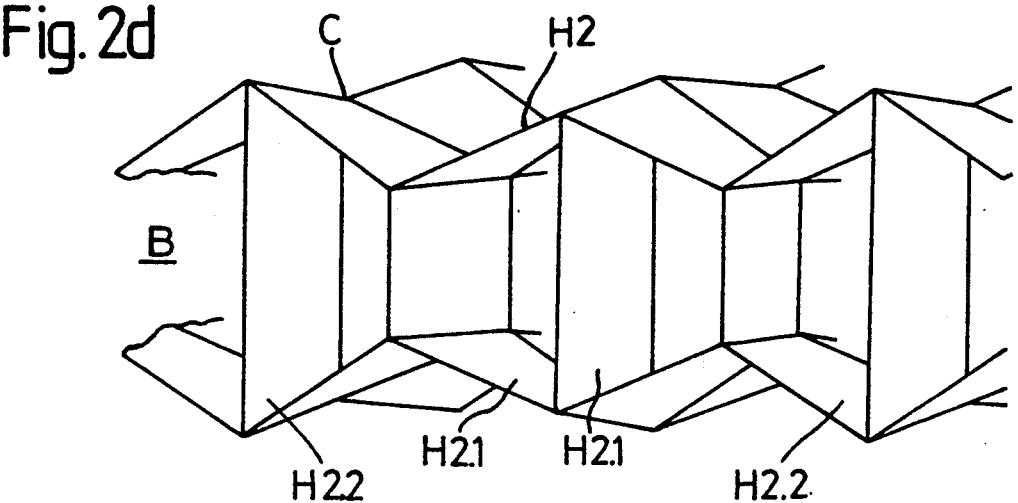

FIG. 2d shows the hollow profile H 2 which is the result and which has identical, but mirror-inverted channel pairs H 2.1 which are connected to one another over an adjoining area, connected alternately with channel pairs H 2.2 which differ in cross-sectional geometry therefrom. In the front plane B the cross-sectional geometry of the hollow profile H 2 corresponds to the representation of this profile in FIG. 2a. In the intermediate plane C and all "imaginary" planes between B and C this hollow profile has a geometry which differs from the front plane B. The geometry change can be brought about during the production process by gradual repositioning of the shaping units 2.2 and 2.3 on the shaping tools 2.

Figure 3A:
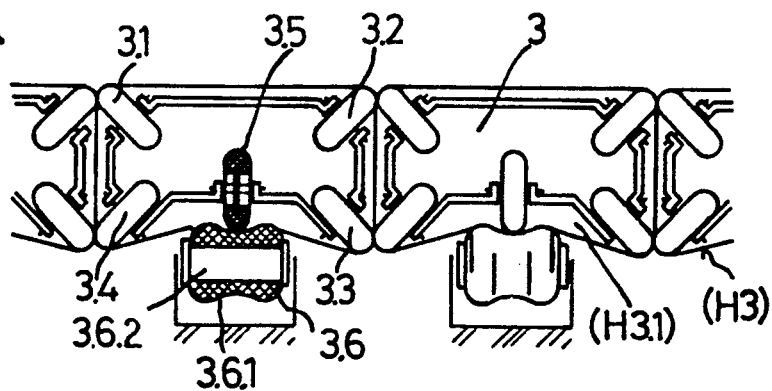

Turning now to the third embodiment depicted in the drawings of FIG. 3,

FIG. 3a shows several shaping tools 3, of identical dimensions and design, arranged side-by-side. Each shaping tool comprises, on the one hand, a component, profiling a channel H 3.1 of the hollow profile H 3 from the inside, which includes shaping units 3.1, 3.2, 3.3, 3.4 and 3.5 and, on the other hand, a component, profiling the said channel of the hollow profile from the outside. The latter consists of a further shaping unit 3.6 having a shaping belt 3.6.1 and deflection rollers 3.6.2.

Figure 3B:

FIG. 3b shows the associated starting material V 3 having pre-formed pockets V 3.1 in an incompletely expanded state.

Figure 3C:
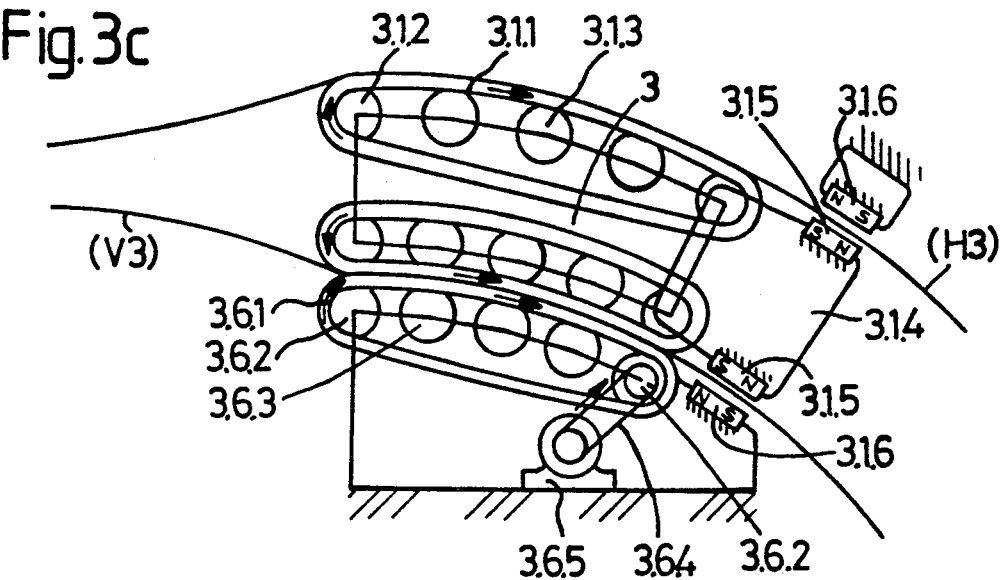

FIG. 3c shows that each shaping tool 3 is so designed that it shapes the starting material into a hollow profile H 3 which is curved in the longitudinal direction. The curvature is brought about by appropriate guidance of the shaping loops 3.1.1 over deflection rollers 3.1.2 and intermediate guides 3.1.3. The external profile-forming component with the profile-forming belt 3.6.1 and the deflection rollers 3.6.2 also has intermediate guides 3.6.3 positioned and/or shaped to impart curvature, and it is so designed that, at the same time, it also brings about the advancing movement of the starting material V 3 or the hollow profile H 3 over the tools 3. For this purpose, one of the deflection rollers 3.6.2 is driven by means of a belt drive 3.6.4 and gearing/motor 3.6.5. The relative motive forces which act during the shaping process on the component of the shaping tool 3 present in the hollow profile H 3, are countered by provision of pairs of magnets 3.1.5 inside the profile, mounted on a retaining frame 3.1.4 as a fixed constituent part of the inner component of the shaping tool 3, and associated pairs of magnets 3.1.6 mounted outside the profile. In this way a "floating" retaining force is generated, which holds the tool 3 in position in the profile, without making any further contact with the hollow profile H 3. The polarity of the magnets is identified by "N" and "S".

Figure 3D:
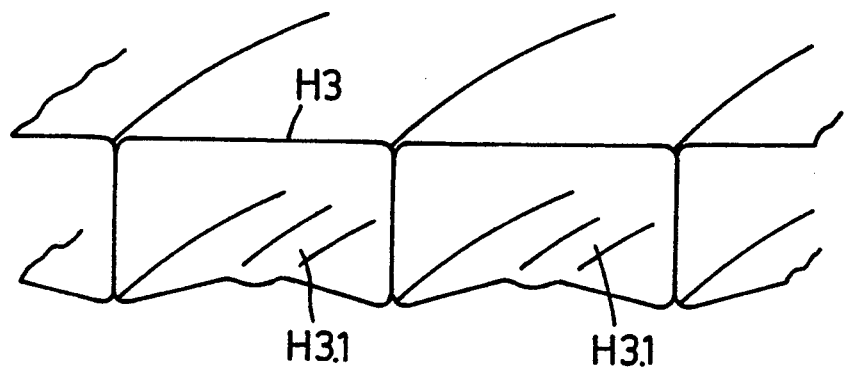

FIG. 3d shows the hollow profile H 3 formed as a result, which has channels H 3.1 arranged side-by-side and connected to one another over an area of their surface, and curvature in the longitudinal direction of the channels.

Figure 4A:
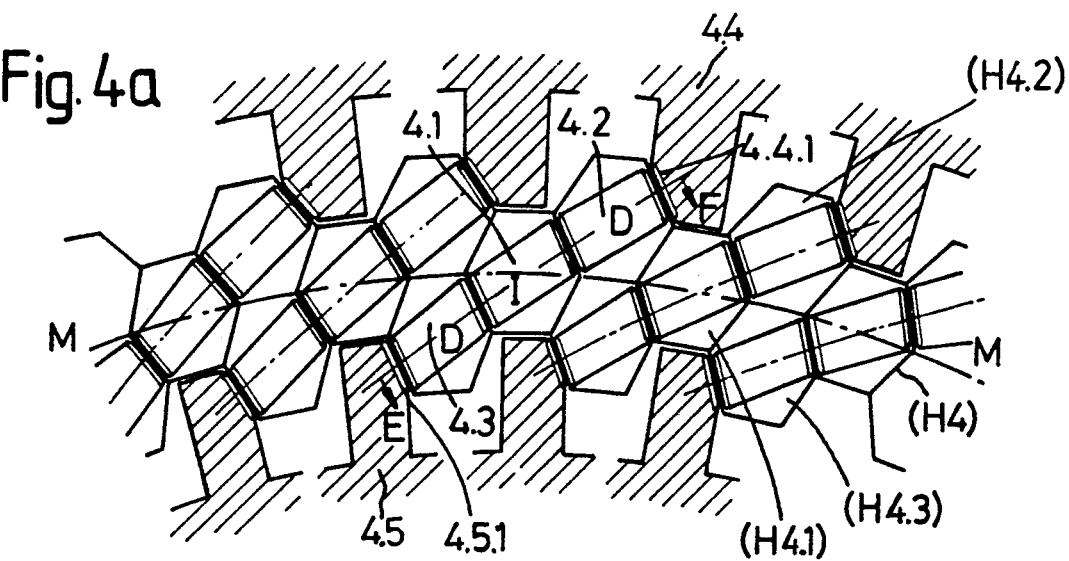
Figure 4B:
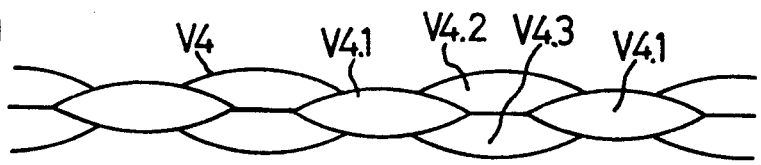
Figure 4C:
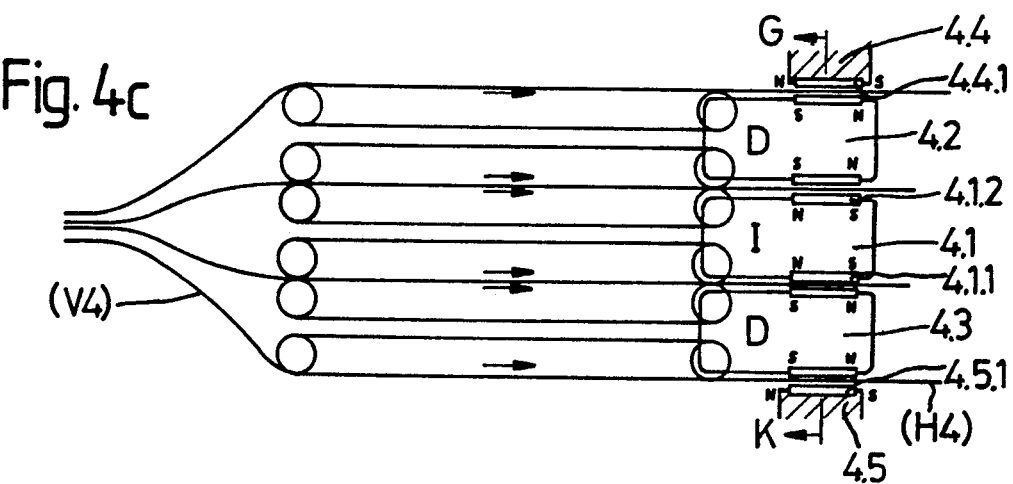

Turning now to the fourth embodiment depicted in the drawings of FIG. 4,

FIG. 4a is a section along the line G-K in FIG. 4c through the retaining magnets of several shaping tools, which are arranged both side-by-side and one above the other, and through a hollow profile H 4 with a corresponding channel arrangement, in which respect the cross-sectional axis M of the channels is curving. For the magnetic retention of the shaping tools, three shaping tools D-I-D form a retention group. The outer tools D in this group have their respective magnet retaining frames 4.2, 4.3 held in position directly by way of magnets 4.4.1 and 4.5.1 which are installed outside the hollow profile H 4 in respective fixed base frames 4.4, 4.5. The shaping tool I arranged centrally in this retention group is, in contrast, held contactlessly and indirectly by way of the aforesaid outer shaping tools D.

FIG. 4b shows the incompletely expanded associated starting material V 4 with the pre-formed pockets V 4.1, V 4.2 and V 4.3, the pockets V 4.2 and V 4.3 being arranged one above the other and partially overlying or surrounding the pockets V 4.1.

FIG. 4c is a longitudinal section along the line E-F in FIG. 4a showing the above described group of three shaping tools D, I, D with the manner of the magnetic retention of the tools being clearly evident. Ultimately, the retention forces for this group of tools are applied solely by the magnets 4.4.1 and 4.5.1 mounted in the respective base frames 4.4 and 4.5, which are arranged outside the starting material V 4 or the hollow profile H 4. These magnets act directly on the outer shaping tools D which have the respective magnet retaining frames 4.2 and 4.3, and, by way of these, also indirectly on the shaping tool lying therebetween which has the magnet retaining frame 4.1. In the case of the last-mentioned shaping tool I, by arranging the magnets 4.1.1 and 4.1.2 on the frame 4.1 so they are of opposite polarity to the magnets on the outer frames 4.2, 4.3 force transmission is effected in a "floating" manner. In other words, no frictional contact takes place to inhibit the advance movement of starting material V 4 or the hollow profile H 4 over the tools.

Figure 4D:
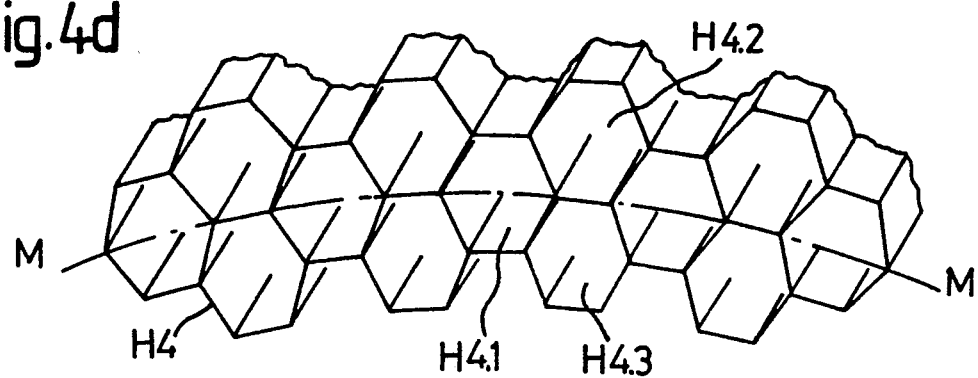

FIG. 4d shows the resulting hollow profile H 4 which has channels H 4.1, H 4.2 and H 4.3 arranged both side-by-side and one above the other, and also has a curved cross-sectional central axis M.

Figure 5:
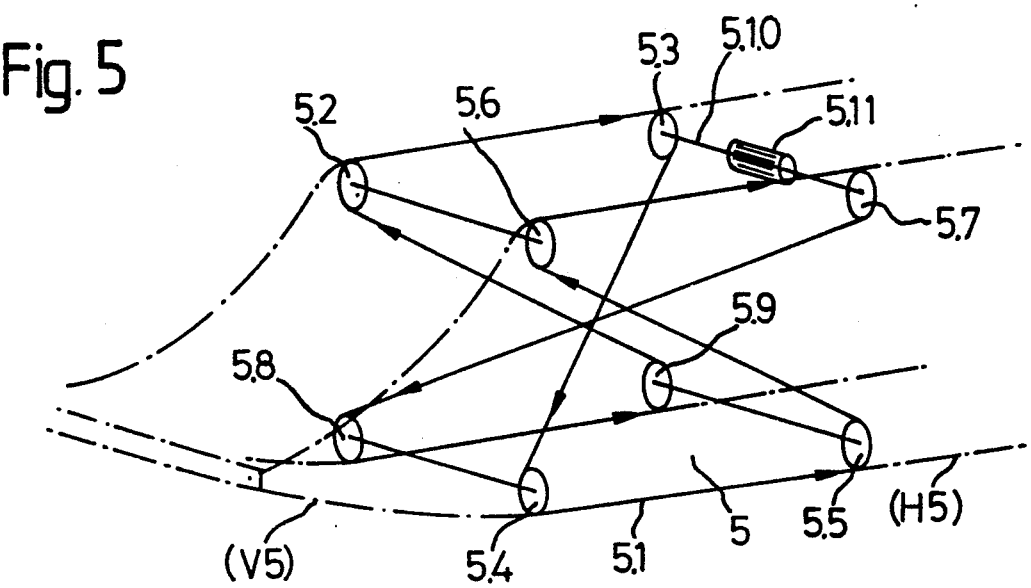
FIGS. 5 and 6b show respective embodiments of shaping tools in perspective representation.

FIG. 5 shows a further embodiment, namely a single channel of a starting material V 5 or of a resulting hollow profile H 5 with a corresponding shaping tool 5 arranged therein. In this case the endless shaping loop 5.1 is conducted successively over eight deflection rollers 5.2 to 5.9. The deflection rollers 5.3 and 5.7 are driven by way of a common axial shaft 5.10 by means of a gearing/motor 5.11 to bring about movement of the loop 5.1 over the rollers 5.2 to 5.9 in sequence and more specifically advancing movements by the loop 5.1, along the four corner contact zones, which are equidirectional with regard to the starting material V 5 or the hollow profile H 5 (see solid arrows in FIG. 5).

Figure 6A:
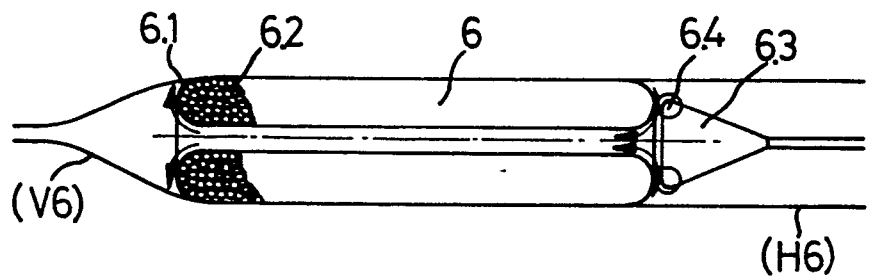
Figure 6B:
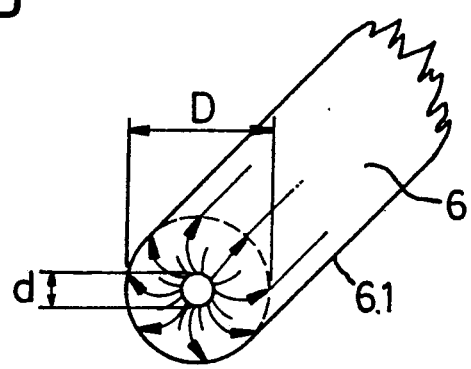

FIGS. 6a and 6b show a fixed embodiment in which the shaping tool 6, shown inside a starting material V 6 or a resulting hollow profile H 6, is of considerably different form to the first five embodiments, consisting of an endless tube-like element the material or tube jacket 6.1 of which moves and in so doing turns in upon itself by returning up the centre of the tube. The tube jacket 6.1 may be filled by a granular material 6.2 or by a liquid or paste or a gas. The forces which, while advancing the material V 6, tend to move the tube 6.1 inside the profile H 6 in the opposite direction can be absorbed or counteracted by supporting rollers 6.4 mounted on a thrust rod 6.3 which extends through the hollow profile H 6.

FIG. 6b shows how at the "head" of the shaping tool 6 the tube jacket 6.1 expands out of the central bore of diameter "d" to the shaping diameter "D". A shaping tool 6 of this type functions most effectively if the material which the tube jacket 6.1 is made is chosen to be a material which tends not to pleat in the centre "d" upon the circumferential reduction of the tube jacket 6.1 from D. to d. which takes place continuously during the production process.

We claim:

1. A method of producing an array of hollow profile elements from a formable workpiece that is composed of a plurality of layers of material having a large width-to-thickness ratio and joined to each other along longitudinal seam-like joins to define parallel longitudinal channels therein, comprising passing through respective ones of said channels a plurality of shaping tools to deform said workpiece into said profile elements of a desire shape, wherein each of said shaping tools comprises a group of at least three shaping units mounted on a support frame for location inside the respective channel of the workpiece, each said shaping unit including
   an endless web and guide means for conducting said endless web in contact with said material the shaping units of each said tool being arranged so that only their endless webs make contact with the material of the workpiece during the shaping process in a manner that avoids any relative displacement between said webs and said material during the shaping process so that sliding friction is substantially eliminated between the material of the workpiece and the shaping tool.

2. The method of claim 1, wherein said shaping tools each include drive means for driving said endless web over said guide means, said drive means causing transport of said workpiece over said tools.

3. The method of claim 1, further comprising varying the geometry of one or more of said shaping tools as said workpiece is transported thereover to produce the respective profile element or elements with a variable geometry.

4. The method of claim 1, further comprising retaining the shaping tools at a predetermined position without mechanical contact with one another during the shaping process by applying an electromagnetic field between adjacent ones of said shaping tools.

5. The method of claim 4, wherein said plurality of shaping tools are disposed transversely with respect to the transport direction of said workpiece, and predetermined outermost ones of said shaping tools are positioned by outer stationary positioning means applying an electromagnetic field to said outermost tools.

6. A shaping tool arrangement for producing an array of hollow profile elements from a formable workpiece that is composed of a plurality of layers of material having a large width-to-thickness ratio adjoined to each other along longitudinal seam-like joins to define parallel longitudinal channels therein, the arrangement comprising a plurality of shaping tools to deform the respective channels of the workpiece into said profile elements of a desired shape, wherein each of said shaping tools comprises a group of at least three shaping units mounted upon a support frame for location inside the respective channel of said workpiece, each said shaping unit including at least one endless web, guide means for conducting said endless web in a loop in contact with an inside surface of a respective channel, the shaping units of each tool being arranged so that only their endless webs make contact with the material of the workpiece during the shaping process in a manner which avoids any relative displacement between said webs and said material during the shaping process so that sliding friction is substantially eliminated between the material of the workpiece and the respective shaping tool.

7. The shaping tool arrangement of claim 6 wherein said endless webs consist of respective belts, and said guide means consist of respective pairs of guide rollers on which associated ones of said belts each travel in a loop over the respective pair of guide rollers, and said frame mounts said guide rollers such that said belts pass on outer sides of their respective loops in contact with the material and return on inner sides thereof out of contact with said material.

8. The shaping tool arrangement of claim 7 wherein said frame includes means for moving at least one of said pairs of said guide rollers relative to the others of said pairs during the shaping process to produce said profile elements with a variable geometry.

9. The shaping tool arrangement of claim 7 further comprising positioning means for retaining said shaping tools at a predetermined position without mechanical contact with one another during the shaping process, including means applying an electromagnetic force between adjacent ones of said shaping tools.

10. The shaping tool arrangement of claim 6 wherein said web includes at least one endless belt, said guide means includes pairs of guide rollers over which said endless belt travels in a closed loop, and said frame mounts said guide rollers such that said belt passes on outer sides of the pairs of rollers in contact with the material and returns on inner sides thereof out of contact with the material.

* * * * *